United States Patent Office 2,716,133
Patented Aug. 23, 1955

2,716,133

PURIFICATION AND SEPARATION OF DICARBOXYLIC ACIDS

Leo S. Pooler, Chicago, Ill., assignor to The C. P. Hall Company of Illinois, Chicago, Ill., a corporation of Ohio No Drawing. Application June 21, 1950, Serial No. 169,542

6 Claims. (Cl. 260—537)

This invention relates to the purification of dicarboxylic acids produced from the oxidation of saturated, unsaturated and substituted fatty acids. It includes the use of the dichlorobenzenes (either pure substances or a mixture of the isomers) for the separation and purification of these acids.

PREPARATION OF DICARBOXYLIC ACIDS

The dicarboxylic acids shown in the example in this disclosure are acids which have been produced by the oxidation of cottonseed fatty acid (largely lineolic and oleic acids), oxidized in a mixture of dilute nitric acid (8 to 30% $HNO_3$) in the presence of excess air, under approximately ten pounds per square inch gauge pressure at a temperature of 234° F.—all of which is covered in patent application by George R. Murphy, Serial No. 169,065, under date of June 19, 1950.

While the acids of the example were produced as outlined above, nevertheless this invention covers the purification and separation of dicarboxylic acids of whatever source, and I do not limit this invention to those dicarboxylic acids produced by the air-nitric acid oxidation method. By fatty acid in this disclosure, I do not limit myself to saturated monocarboxylic acids but I include unsaturated and substituted acids as they are generally considered to be in the fatty acid field. Such monocarboxylic acids include the mixed fatty acids derived from linseed oil, soybean oil, castor oil, coconut oil, cottonseed oil, peanut oil, tall oil, sunflowerseed oil, rapeseed oil, mustardseed oil, safflowerseed oil, corn oil; sea animal oils including fish oils; animal oils, such as tallow, lard, oil, etc.

When the foregoing monocarboxylic acids are oxidized by nitric acid the product in the water phase may contain, among other things, the following:

a. Monocarboxylic acids such as pelargonic acid and lower molecular weight fatty acids.
b. Aldehydes.
c. Semialdehydes (a monocarboxylic acid with the terminal $CH_3$ oxidized to the aldehyde), also called half aldehydes.
d. Dialdehydes.
e. Odd-numbered carbon dicarboxylic acids.
f. Even-numbered carbon dicarboxylic acids.
g. Nitric acid and oxides of nitrogen.
h. Water

PURIFICATION AND SEPARATION OF DICARBOXYLIC ACIDS

The purification of dicarboxylic acids is covered to some extent in the U. S. patent applications of Roger L. Logan, Serial No. 57,370, filed October 29, 1948, now abandoned (but see Logan 2,662,908) and George R. Murphy, Serial No. 169,065, filed June 19, 1950. Certain improvements have been made in the purification process not covered by either of the two foregoing inventions. The invention disclosed here describes these improvements.

The water phase, containing mixed dicarboxylic acids as well as all the impurities previously listed (a, b, c, d, g, and h), is evaporated so that the solids content of the solution is increased to between 60% and 85% while being blown vigorously with air to effect further oxidation.

The dicarboxylic acid solution is then delivered to the crystallizer where it is cooled slowly to develop large crystals, after which the slurry is filtered and the crystals are washed. The mother liquor, is returned to the reactor for further oxidation. Small amounts of dicarboxylic acids are found in the mother liquor.

The crude dicarboxylic acids coming from the filters contain the same impurities as previously listed (a, b, c, d, g, and h), but in lesser amounts than before the concentration, crystallization and filtration.

The method of use of dichlorobenzene as a solvent is shown by the following example:

*Example*

To 500 pounds of crude dicarboxlic acids crystallized from the aqueous reaction product from such nitric acid oxidation were added 1250 pounds of dichrorobenzene (86% ortho and 14% para). The batch was then heated to 273° F. in order to dissolve the dicarboxylic acids. The solution was then cooled to 210°–215° F. in about one hour and then centrifuged to secure the first "cut" of crystals (Cut No. 1). Seventy-two pounds of crystals were recovered which had an equivalent weight of 58.8.

The solvent solution was then cooled slowly to 160°–170° F. and the second cut of crystals was procured (Cut No. 2). This cut amounted to 96 pounds with an equivalent weight of 64.8. This equivalent weight indicates that this is a mixture of succinic and adipic acids.

The mother liquor was then cooled to 68° F. and the third cut (Cut No. 3) of 190 pounds, with an equivalent weight of 77.9, was obtained.

The third cut (190 pounds) was taken up in 110 pounds of water, first, to remove the remaining dichlorobenzene and, second, to separate the more water-soluble dicarboxylic acids (succinic and adipic) from the less water-soluble acid (suberic). The dichlorobenzene was removed from the batch by steam distillation—which removed not only the dichlorobenzene but also the remaining traces of nitric acid. The batch was cooled to 100° F. and portion No. 3 (a)—106 pounds, with an equivalent weight of 84.3—was removed. The mother liquor was then cooled to 65° F. This gave portion No. 3 (b)—30 pounds, with an equivalent weight of 72.3.

The analysis of cut No. 3 (a) was found to be:

78.0% suberic acid
20.0% adipic acid
2.0% azelaic acid

This analysis gave a calculated equivalent weight of 84.39 against the 84.3 reported above.

To 65 pounds of Cut No. 3 (a) dicarboxylic acids were added 430 pounds of water. The batch was heated to 190° F. It was then cooled slowly to 67° F. Forty-five pounds of dry acids were obtained. This batch (No. 3 (a) 1) showed an equivalent weight of 83.6.

The 45 pounds of acids from the previous crystallization (No. 3 (a) 1) were dissolved in 334 pounds of water at 212° F. and the batch was cooled to 80° F. and approximately 28 pounds of acids were obtained with the following analysis:

CUT NO. 3 (a) 2

97.00±1% suberic acid
2.00% azelaic acid
0.50% adipic acid
0.40% non-volatile
0.20% monobasic acid (as $C_9$)
0.02% ash in non-volatile Cut No. 1 was reworked as follows: To 72 pounds of dicarboxylic acids were added 110 pounds of water. Five pounds of nitric acid were added and the batch was heated to 100° C., filtered to remove foreign matter, then allowed to cool and the resultant crystals were recovered by filtration. Forty-two pounds of dicarboxylic acid were procured having an equivalent weight of 59.0. Pure succinic acid has an equivalent weight of 59.045. This material when analyzed was found to be 98.9% pure which was higher in succinic acid than some C. P. succinic acid with which it was compared.

The remaining filtrates were collected for reworking. A material balance was not run. The example is offered to show that by the use of water, and a non-polar solvent such as dichlorobenzene it is possible to separate suberic acid and succinic acid from the batch of mixed dicarboxylic acids and thus secure a high grade technical product in each case.

The dichlorobenzene used in the foregoing illustration, while not pure ortho, is the dichlorobenzene of commerce. I do not limit myself to its use but my invention applies to mixtures of the isomers, ortho, meta and para. It is inconvenient to use para dichlorobenzene alone because of its high melting point. Higher chlorinated products of benzene may be used but since they are still higher in molecular weight they have higher boiling points than dichlorobenzene and hence offer a little more difficulty in regeneration of the solvent for reuse.

The dichlorobenzene which has been used for several batches is highly contaminated. When it is felt that the dichlorobenzene can no longer be used because of contamination, it is passed through a steam stripping column and the nitric acid and the dichlorobenzene are distilled off. The residue is returned to the reactor for further oxidation, together with the dicarboxylic acids which had been dissolved in the dichlorobenzene. The dichlorobenzene is used again and again for the separation and purification of mixed dicarboxylic acids.

Dilute nitric acid was employed in the final clean-up of the acid crystals since iron, copper and nickel were present as impurities from piping and equipment. Without the use of nitric acid the finished dicarboxylic acid had a green to brown color from metal contamination while with nitric acid in the water solution, these metal salts were converted to soluble nitrates and were removed from the product, giving a good looking product low in ash content.

The process of separation and purification outlined here, as a method of purification applying to crude dicarboxylic acids, applies equally well to a product after preliminary purification and to material from other sources than that of air-nitric acid oxidation. While I have used the nitric acid oxidation method in my example, I do not limit myself thereto.

I claim:

1. The process of recovering dicarboxylic acid from a solution of longer and shorter chain dicarboxylic acids in a dichloro benzene, which comprises cooling the solution from a relatively high temperature at which at least a part of the acid of shortest chain length is crystallized from the solution while retaining acid of longer chain length in solution, dissolving in water at a relatively high temperature acid thus crystallized from the solution and adding a minor per cent of nitric acid thereto, and then cooling this aqueous solution to a relatively low temperature and thereby crystallizing dicarboxylic acid of shorter chain length therefrom.

2. In the purification of dicarboxylic acids in solution in non-polar solvent and contaminated with salt of metal from the class consisting of iron, copper and nickel which comprises crystallizing dicarboxylic acid from said solution together with said salt, preparing from the crystalline mass an aqueous solution containing dilute nitric acid, and then crystallizing dicarboxylic acid from the aqueous solution while leaving the metal salt in solution in the mother liquor.

3. The process of separating dicarboxylic acids of different chain lengths from a crystalline mixture containing succinic, adipic and suberic acids, which comprises dissolving the mixture in dichlorobenzene with heat, cooling the resulting solution to obtain three crystalline fractions, the first of which is largely succinic acid and the last of which is largely suberic acid, dissolving these two respective fractions separately in water and separately crystallizing therefrom succinic acid and suberic acid, each in a relatively high state of purity.

4. The process of the preceding claim in which the crystalline starting material is contaminated with a salt of a metal of the class consisting of iron, copper and nickel, and in one of the recrystallizations from water using dilute nitric acid whereby said metal salt remains dissolved in the aqueous mother liquor resulting from said crystallization, whereby the metals are separated from the crystallized dicarboxylic acid and the dicarboxylic acid is substantially free from such metal salt.

5. The process of treating a crystalline mixture of succinic, adipic and suberic acids and recovering one of said acids therefrom substantially free of the other two acids, which comprises dissolving the crystalline mixture in dichlorobenzene with heat, thereafter cooling and obtaining a crystalline fraction which contains the desired acid and no more of the other two acids than is readily soluble in water, and then by crystallization from water obtaining the desired acid substantially free from the other two acids.

6. The process of separating two dicarboxylic acids of different chain lengths from a crystalline mixture of the two, the first of said acids being of the class consisting of succinic and adipic acids and the second acid being of the class consisting of adipic and suberic acids, which comprises dissolving the mixture in a dichlorobenzene, then cooling and thereby separating from the solution a crystalline fraction, then further cooling the resulting dichlorobenzene solution and obtaining a second crystalline fraction containing a mixture of the first and second acids, dissolving this fraction in water with heat and then by cooling the resulting aqueous solution separating the second acid while leaving in the aqueous mother liquor substantially all of the first acid present in the fraction.

References Cited in the file of this patent

UNITED STATES PATENTS

| Number | Name | Date |
|---|---|---|
| 1,887,232 | Coleman | Nov. 8, 1932 |
| 2,300,955 | Meier | Nov. 3, 1942 |
| 2,343,534 | Cavanaugh et al. | Mar. 7, 1944 |
| 2,352,547 | Jenkins | June 27, 1944 |
| 2,365,290 | Price et al. | Dec. 19, 1944 |
| 2,369,036 | Fitzpatrick et al. | Feb. 6, 1945 |
| 2,420,938 | Doumani et al. | May 20, 1947 |
| 2,557,282 | Hamblet et al. | June 19, 1951 |
| 2,560,156 | Cavanaugh et al. | July 10, 1951 |
| 2,603,667 | Pankratz et al. | July 15, 1952 |

OTHER REFERENCES

MacArdle: "Solvents in Synthetic Organic Chemistry," Van Nostrand, p. 135 (1925).